3,257,416
COUMARIN PHOSPHATES
Norman Cooper Brown, Berkhamsted, and Donald Thomas Hollinshead, Hemel Hempstead, England, assignors to Cooper, McDougall & Robertson Limited, Berkhamsted, England, a British company
No Drawing. Filed Apr. 29, 1963, Ser. No. 276,219
13 Claims. (Cl. 260—343.2)

In the specification of co-pending patent application No. 156,477, filed December 1, 1961 there are described organo-phosphorus compounds of formula (1)

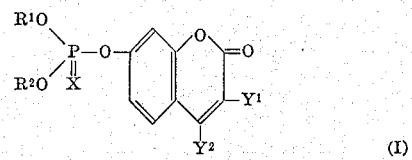

wherein $R^1$ and $R^2$ are the same or different, each is an alkyl group containing from one to six carbon atoms, and at least one of the said groups $R^1$ and $R^2$ is substituted with one halogen atom;

X is an oxygen or sulphur atom; and $Y^1$ and $Y^2$ are the same or different and each is a hydrogen or halogen atom or an alkyl group containing from one to four carbon atoms, or a benzyl or phenyl group, the said benzyl and phenyl groups being optionally substituted in the ring with one or more members of the class consisting of halogen atoms, nitro groups, and alkyl groups containing from one to four carbon atoms; or $Y^1$ and $Y^2$ form a group $Y^1$—$Y^2$ which is an alkylene chain containing from three to six carbon atoms.

The organo-phosphorus compounds of Formula I are described in the specification as being effective in decreasing infestations of the nematodes *Aspiculuris tetraptera*, *Nematospiroides dubius* and *Syphacia obvelata* in the gastro-intestinal tract of mice, of *Cooperia* spp., *Haemonchus* spp., *Oesophagostomum* spp., *Stronglyoides* spp., *Trichostrongylus* spp. and *Nematodirus* spp. in the gastro-intestinal tract of sheep and cattle, of *Ancylostoma* spp. and *Toxascaris* spp. in the gastro-intestinal tract of dogs, and of *Capillaria obsignata* in chickens.

It has now been found that organo-phosphorus compounds of Formula II, closely related in structure to the compounds of Formula I, also have activity against the same list of gastro-intestinal nematodes.

This invention therefore provides an improvement in or a modification of the invention described and claimed in the said co-pending application, comprising an organo-phosphorus compound of Formula II

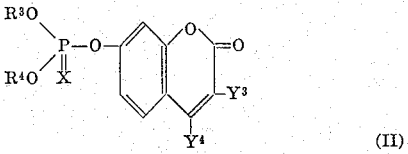

wherein $R^3$ and $R^4$ are the same or different and each is an alkyl group having from 1 to 4 carbon atoms and each group is substituted with one halogen atom;

X is an oxygen or sulphur atom; and $Y^3$ and $Y^4$ are the same or different and each is an alkoxycarbonyl group or an alkoxycarbonylalkyl group; or $Y^3$ is a hydrogen atom or a methyl group when $Y^4$ is an alkoxycarbonyl group or an alkoxycarbonylalkyl group; or $Y^4$ is a hydrogen atom or a methyl group when $Y^3$ is an alkoxycarbonyl group or an alkoxycarbonylalkyl group; the said "alkoxycarbonyl" groups and the "alkoxycarbonyl" of the said "alkoxycarbonylalkyl" groups each having from 2 to 6 carbon atoms, and the "alkyl" of the said "alkoxycarbonylalkyl" groups having from 1 to 4 carbon atoms.

This invention in another aspect therefore provides a method for the treatment of a netamode infestation comprising the administration of an organo-phosphorus compound of Formula II to the host of the nematode infestation.

An organo-phosphorus compound of Formula II may be prepared by the reaction of a phosphorus compound of Formula III,

with a coumarin compound of Formula IV

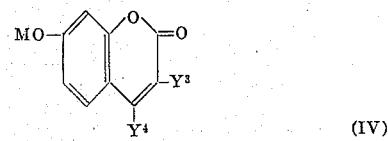

wherein Z is a halogen atom when M is a hydrogen atom or an alkali metal atom, or both Z and N are each a hydrogen atom; $R^3$, $R^4$ and X as defined in Formula II.

For example, an organo-phosphorus compound of Formula II may be prepared by the reaction of a phosphorus compound of Formula III wherein Z is a chlorine atom with a coumarin compound of Formula IV, wherein M is a hydrogen atom, in the presence of an acid binding agent such as an alkali carbonate, for example sodium carbonate, or an organic base, for example triethylamine, of a solvent such as acetone, ethylmethylketone, methylpropylketone, toluene or benzene, and of a catalyst such as finely divided copper, and with heating. The reaction may similarly be carried out in the absence of the acid binding agent, if in the coumarin compound of Formula IV, M is an alkali metal atom.

Alternatively, an organo-phosphorus compound of Formula II may be prepared by reacting a phosphorus compound of Formula III, wherein Z is a hydrogen atom, with a coumarin compound of Formula IV wherein M is also a hydrogen atom, in the presence of an acid binding agent such as an alkali carbonate, for example potassium carbonate, or an organic acid binding agent, for example pyridine, preferably at a temperature between 10° and 50° C. The reaction is preferably carried out in a solvent such as carbon tetrachloride which also acts as an oxidising agent or, if a non-oxidising solvent such as benzene is used an oxidising agent such as carbon tetrabromide is added.

This invention in a further aspect therefore provides the above described method of preparing an organo-phosphorus compound of Formula II.

In use, an organo-phosphorus compound of Formula II together with an acceptable carrier therefor may be presented as a composition. A composition may contain a diluent and a dispersing or surface active agent and may be presented in a draft or drench in water, in capsules or cachets in the dry state or in a non-aqueous suspension when a suspending agent may be included, in tablets when a binder or lubricant may be included, in a suspension in water or an oil or in a water/oil emulsion when a flavouring, preserving, thickening or emulsifying agent may be included, or in the food of the host.

The preferred compositions for the treatment of nematode infestations are a dispersible, or a wettable powder or a tablet.

This invention in two further aspects therefor provides a nematodicidal composition comprising an organo-phosphorus compound of Formula II and an acceptable carrier therefor, and the method of making the nematodicidal composition which comprises the admixture of the components.

ner described in the examples listed in the column headed "Preparation."

| Example | Compound | Uncorrected M.P., degrees | Preparation | Composition of Compound | |
|---|---|---|---|---|---|
| | | | | Found on analysis, percent P | Theoretical, percent P |
| 3 | O,O-bis(2-chloroethyl)-O-(3-ethoxycarbonylcoumarin-7-yl)phosphate. | 58–60 | 2 | 7.00 | 7.06 |
| 4 | O,O-bis-(2-chloroethyl)-O-(3-methoxycarbonylmethyl-4-methylcoumarin-7-yl)phosphate. | 64–65 | 2 | 6.43 | 6.84 |
| 5 | O,O-bis-(2-chloroethyl)-O-(3-butoxycarbonylmethyl-4-methylcoumarin-7-yl)phosphate. | 65–67 | 2 | 6.6 | 6.3 |
| 6 | O,O-bis-(2-chloroethyl)-O-(3-ethoxycarbonylethyl-4-methylcoumarin-7-yl)phosphate. | 65–66 | 2 | 6.2 | 6.4 |
| 7 | O,O-bis-(2-chloroethyl)-O-(3-ethoxycarbonyl-4-methylcoumarin-7-yl)phosphate. | 69–71 | 1 | | |
| 8 | O,O-bis-(2-chloroethyl)-O-(3-α-ethoxycarbonylethyl-4-methylcoumarin-7-yl)phosphate. | (1) | 2 | | |
| 9 | O,O-bis-(2-chloroethyl)-O-(3-isopropoxycarbonylmethyl-4-methylcoumarin-7-yl)phosphate. | 92–93 | 2 | | |
| 10 | O,O-bis-(2-chloroethyl)-O-(4-isopropoxycarbonylcoumarin-7-yl)phosphate. | 70–71 | 2 | | |

$^1$ $n_D^{17}$=1.553.

In order that the invention may be clearly understood some examples of the invention will now be described in which all temperatures are given in degrees Celsius, all percentages are by weight and "M.P." represents the melting point.

*Example 1*

To a mixture of 4-ethoxycarbonyl-7-hydroxy coumarin (11.7 g.) anhydrous potassium carbonate (14.0 g.) and methyl ethyl ketone (250 ml.) which had been heated and stirred for one hour, was added bis-(2-chloroethyl) phosphochloridate (12.0 g.) during 30 minutes and the mixture heated for three hours under reflux. After the suspension had cooled, it was filtered and the solvent removed by distillation. The residue was dissolved in chloroform (100 ml.) and the solution washed twice with a solution of sodium carbonate (100 ml.), then with water (50 ml.), dried over anhydrous sodium sulphate and the solvent evaporated. The residual yellow oil dissolved readily in ethanol and the addition of di-isopropyl ether afforded crystals of O,O-bis(2-chloroethyl)-O-(4-ethoxycarbonyl-coumarin-7-yl)phosphate having M.P. 68–70°. On analysis it was found to contain 7.44% phosphorus (theoretical amount is phosphorus 7.06%).

*Example 2*

To a mixture of 3-ethoxycarbonylmethyl-4-methyl-7-hydroxycoumarin (26.2 g.) and bis-(2-chloroethyl)phosphite (20.7 g.) in carbon tetrachloride (200 ml.) was slowly added triethylamine (13.5 g.) with stirring and the temperature of the mixture maintained below 35° by suitable cooling. After the addition was complete the mixture was stirred for several hours at room temperature and chloroform (100 ml.) and water (100 ml.) were added to dissolve the precipitated solids. The lower chloroform layer was washed successively with dilute hydrochloric acid, a solution of sodium carbonate and water and the washed solution dried over anhydrous sodium sulphate and evaporated. The oily residue was dissolved in ethanol and on the addition of di-isopropyl ether colourless crystals of O,O-bis-(2-chloroethyl)-O-(3-ethoxycarbonylmethyl-4-methylcoumarin-7-yl)phosphate were precipitated having M.P. 68–69°. On analysis it was found to contain phosphorus 6.57%, carbon 46.37%, hydrogen 4.65% and chlorine 14.62% (theoretical amounts are phosphorus 6.64%, carbon 46,37%, hydrogen 4.53% and chlorine 15.18%).

In Example 8, the product was obtained as a yellow oil, the refractive index $n_D^{19}$ of which is shown on the following table under the column headed "Uncorrected M.P."

The following compounds were prepared in the manner described in the examples listed in the column headed "Preparation."

*Example 11*

A mixture of ethylsodiumoxaloacetate (750 g.), resorcinol (500 g.) and ethanol (1300 ml.) was refluxed with efficient stirring for 45 minutes. The resulting mixture was cooled to 45°, acidified with 3N sulphuric acid and diluted with iced water (1 litre). The mixture was then allowed to stand for 30 minutes and was then poured in a thin stream into well-stirred iced water (1.5 litre). After stirring for 10 minutes, the resulting solid was filtered off, washed with water and dried at about 110°. The product, identified as 7-hydroxy-4-ethylcarbonylcoumarin, had a M.P. 149–151°.

To a stirred mixture of 7-hydroxy-4-ethoxycarbonylcoumarin (135 g.), O,O-bis-(2-chloroethyl)phosphite (120 g.) and carbon tetrachloride, was added triethylamine (73.5 g.) at such a rate as to maintain the temperature at about 35°. When the addition was complete, the mixture was stirred overnight a room temperature to yield a solid mass. This solid was treated with water (300 ml.) and stirred for 10 minutes before the addition of sufficient chloroform to render all the solid into solution. The solution was then washed successively with 2N hydrochloric acid, a solution of sodium bicarbonate, water and brine and subsequently dried over, anhydrous sodium sulphate. The excess of solvent was evaporated off under reduced pressure and the oily residue dissolved in an equal volume of I.M.S. Charcoal was added to the solution of the oil which was then filtered and diluted with an equal volume of diisopropyl ether. The product was a colourless crystalline solid having a M.P. 70–71° and identified as O,O-bis-(2-chloroethyl)-O-(4-ethoxycarbonylcoumarin-7-yl)phosphate.

*Example 12*

A composition comprising a 40% dispersed solid was prepared from the following:

|  | G. |
|---|---|
| O,O-bis - (2 - chloroethyl) - O - (4-ethoxycarbonylcoumarin-7-yl)phosphate | 40.0 |
| Dispersol AC | 2.0 |
| Carragheen gel (of 7.5% in $H_2O$) | 7.0 |
| Water | 51.0 |

The phosphate was milled with the Dispersol AC and mixed with the other constituents of the composition.

Dispersol AC is a solid anionic dispersing agent of disodium methylene-dinaphthalene sulphonic acid. Carragheen also known as Chondrus, pig-wrack, or pearl moss, is a dried bleached plant containing up to 80% of the calcium salt of a sulphuric ester of a colloidal carbohydrate complex containing a high proportion of galactose groups.

What we claim is:
1. An organo-phosphorus compound of the formula

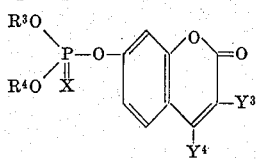

wherein
R³ and R⁴ are each a monochloro alkyl group having from 1 to 4 carbon atoms;
X is selected from the class oxygen and sulphur;
and Y³ and Y⁴ are selected from the class consisting of hydrogen, methyl, alkoxycarbonyl and alkoxycarbonylalkyl, at least one of Y³ and Y⁴ being selected from the class consisting of alkoxycarbonyl and alkoxycarbonylalkyl, the said "alkoxycarbonyl" and the "alkoxycarbonyl" of the said "alkoxycarbonylalkyl" each having from 2 to 6 carbon atoms, and the "alkyl" of the said "alkoxycarbonylalkyl" having from 1 to 4 carbon atoms.

2. An organo-phosphorus compound of the formula

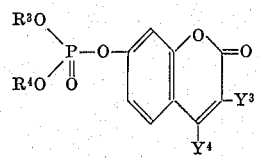

wherein R³ and R⁴ are each 2-chloroethyl, Y³ is alkoxycarbonylalkyl and Y⁴ is methyl, the "alkoxycarbonyl" of the said "alkoxycarbonylalkyl" having from 2 to 6 carbon atoms and the "alkyl" of the said "alkoxycarbonylalkyl" having from 1 to 4 carbon atoms.

3. An organo-phosphorus compound of the formula

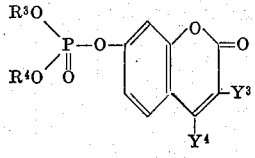

wherein R³ and R⁴ are each 2-chloroethyl, Y³ is a hydrogen atom, and Y⁴ is alkoxycarbonyl having from 2 to 6 carbon atoms.

4. O,O - bis(2 - chloroethyl) - O - (4 - ethoxycarbonylcoumarin-7-yl)phosphate.
5. O,O - bis(2 - chloroethyl) - O - (3 - ethoxycarbonylmethyl-4-methylcoumarin-7-yl)phosphate.
6. O,O - bis(2 - chloroethyl) - O - (3 - ethoxycarbonylcoumarin-7-yl)phosphate.
7. O,O - bis(2 - chloroethyl) - O-(3-methoxycarbonylmethyl-4-methylcoumarin-7-yl)phosphate.
8. O,O - bis(2 - chloroethyl) - O - (3 - butoxycarbonylmethyl-4-methylcoumarin-7-yl)phosphate.
9. O,O - bis(2 - chloroethyl) - O - (3 - ethoxycarbonylethyl-4-methylcoumarin-7-yl)phosphate.
10. O,O - bis(2 - chloroethyl) - O - (3-ethoxycarbonyl-4-methylcoumarin-7-yl)phosphate.
11. O,O - bis(2 - chloroethyl) - O - (3 - α - ethoxycarbonylethyl-4-methylcoumarin-7-yl)phosphate.
12. O,O - bis(2 - chloroethyl) - O - (3 - isopropoxycarbonylmethyl-4-methylcoumarin-7-yl)phosphate.
13. O,O - bis(2 - chloroethyl) - O - (4 - isopropoxycarbonylcoumarin-7-yl)phosphate.

References Cited by the Examiner

UNITED STATES PATENTS

| | | | |
|---|---|---|---|
| 2,536,647 | 1/1951 | Kosolapoff | 260—461 |
| 2,657,229 | 10/1953 | Orochena | 260—461 |
| 2,857,401 | 10/1958 | Rorig | 260—343.2 |
| 2,951,851 | 9/1960 | Fusco et al. | 260—343.2 |
| 3,005,753 | 11/1961 | Vierling | 167—33 |
| 3,011,943 | 12/1961 | Rogers et al. | 167—33 |
| 3,061,613 | 10/1962 | Newallis et al. | 260—343.2 |

FOREIGN PATENTS 510,817   5/1952   Belgium.

OTHER REFERENCES

Kabachnik et al.: "Chem. Abstracts, vol. 54 (1960), pages 8594–5.
Losco et al.: "Gazz. Chim. Ital.," vol. 89 (1959), pages 1298–1303.

WALTER A. MODANCE, *Primary Examiner.*
NICHOLAS S. RIZZO, *Examiner.*